US011761857B1

(12) United States Patent
Rahmouni (10) Patent No.: US 11,761,857 B1
(45) Date of Patent: Sep. 19, 2023

(54) DEVICE FOR ROTATING AND INSPECTING TIRES

(71) Applicant: KING FAISAL UNIVERSITY, Al-Ahsa (SA)

(72) Inventor: Mohieddine Rahmouni, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/197,253

(22) Filed: May 15, 2023

(51) Int. Cl.
*G01M 17/02* (2006.01)
*B60C 25/00* (2006.01)

(52) U.S. Cl.
CPC ......... *G01M 17/022* (2013.01); *B60C 25/002* (2013.01)

(58) Field of Classification Search
CPC ............. G01M 17/022; G01M 17/027; G01M 17/0072; G01M 17/0074; B60C 25/002; B60C 25/0554; B60C 25/007
See application file for complete search history.

(56) References Cited

U.S. PATENT DOCUMENTS

| | | | |
|---|---|---|---|
| 4,140,191 A | | 2/1979 | Hickey |
| 5,165,273 A | * | 11/1992 | Church ................. B60C 25/002 73/146 |
| 9,566,827 B2 | | 2/2017 | Hodges et al. |
| 2007/0138112 A1 | | 6/2007 | Meyer et al. |
| 2010/0058851 A1 | * | 3/2010 | Lawrence ................ G01L 5/282 73/123 |
| 2023/0008450 A1 | * | 1/2023 | Box ..................... B60C 25/0554 |

FOREIGN PATENT DOCUMENTS

| | | |
|---|---|---|
| CN | 107191037 A | 9/2017 |
| DE | 102015014449 B4 | 6/2017 |
| GB | WO-8900514 A1 * | 1/1989 ............. B60K 25/08 |
| WO | 2017052427 A1 | 3/2017 |

OTHER PUBLICATIONS

TRAC Tire Rotation Assistance Cart, sold by TRAC at the website www.liftwithtrac.com/products/lift-with-trac (website accessed Mar. 30, 2023).

* cited by examiner

*Primary Examiner* — Eric S. McCall
*Assistant Examiner* — Timothy P Graves
(74) *Attorney, Agent, or Firm* — Nath, Goldberg & Meyer; Richard C. Litman (57) ABSTRACT

The device for rotating and inspecting tires includes a housing having opposed upper and lower surfaces, with a ramp portion of the upper surface being inclined and a support portion of the upper surface having a depression formed therein. A pair of spaced apart slots are formed through the upper surface within the depression. A pair of rollers are mounted within the housing beneath the pair of spaced apart slots. Each of the rollers has an adjustable height such that the pair of rollers may be selectively raised and lowered through the pair of spaced apart slots. The rollers are driven to rotate by motors or the like such that, in use, each tire may be lifted off the upper surface of the housing by raising the rollers, and the rollers may be driven to rotate the tire. Optical sensors are provided to inspect the tire.

20 Claims, 5 Drawing Sheets

DEVICE FOR ROTATING AND INSPECTING TIRES

BACKGROUND

1. Field

The disclosure of the present patent application relates to vehicle maintenance, and particularly to a device for rotating and inspecting vehicle tires.

2. Description of the Related Art

When a vehicle is parked for a considerable amount of time, the tires of the vehicle deform such that the bottoms of the tires become flat. For vehicles that are parked for extended periods of time, this deformation can become permanent. In order to prevent such deformation, wheels of vehicles are commonly either raised on jacks and rotated by hand, or the vehicle is periodically driven forward or backward by a small amount. Either choice requires effort on the part of the vehicle owner and also suffers from the risk that the tire will be rotated a full 360° back to its original position. Additionally, for vehicles that are left immobile for considerable lengths of time, the tires may suffer from slow leaks and/or age-related wear, which would ordinarily be detected through regular use and maintenance of the vehicle. Thus, a device for rotating and inspecting tires solving the aforementioned problems is desired.

SUMMARY

The device for rotating and inspecting tires includes a housing having opposed upper and lower surfaces, the upper surface having an inclined ramp portion and a support portion having a depression formed therein. The lower surface is adapted for resting on a support surface, such as the ground or the floor, and the upper surface is adapted for receiving a tire of a vehicle within the depression. In use, four such devices may be arranged on the floor of a garage, for example, and the vehicle may be driven to ascend the ramp portions of each device, with the tires of the vehicle coming to a rest within the respective depressions.

Within each device, a pair of spaced apart slots are formed through the upper surface within the depression. A pair of rollers are disposed within the housing beneath the pair of spaced apart slots. Each of the rollers has an adjustable height such that the pair of rollers may be selectively raised through the pair of spaced apart slots to a height above the depression formed in the upper surface and may be selectively lowered through the pair of spaced apart slots to rest within the housing. The rollers are driven to rotate by motors or the like such that, in use, each tire may be lifted off the upper surface of the housing by raising the rollers, and the rollers may be driven to rotate the tire.

The rollers may be raised and lowered by linear actuators or the like, and both the raising and lowering of the rollers and the rotation of the rollers may be controlled by a controller mounted within the housing. At least one pressure sensor may be mounted on the upper surface of the housing between the pair of spaced apart slots. The at least one pressure sensor may also be in communication with the controller such that the controller may determine a surface area of the tire that contacts the at least one pressure sensor when it rests on the at least one pressure sensor within the depression.

Additionally, at least one first optical sensor may be mounted on the upper surface of the housing for visually measuring dimensions and shape of the tire within the depression. The at least one first optical sensor may be in communication with the controller such that the controller may determine a deviation between measured dimensions and a measured shape of the tire and predetermined ideal dimensions and a predetermined ideal shape of the tire. At least one second optical sensor may also be mounted on the upper surface of the housing for visually determining material properties of the tire. The at least one second optical sensor may also be in communication with the controller such that the controller may determine a deviation between measured material properties of the tire and predetermined ideal material properties of the tire.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
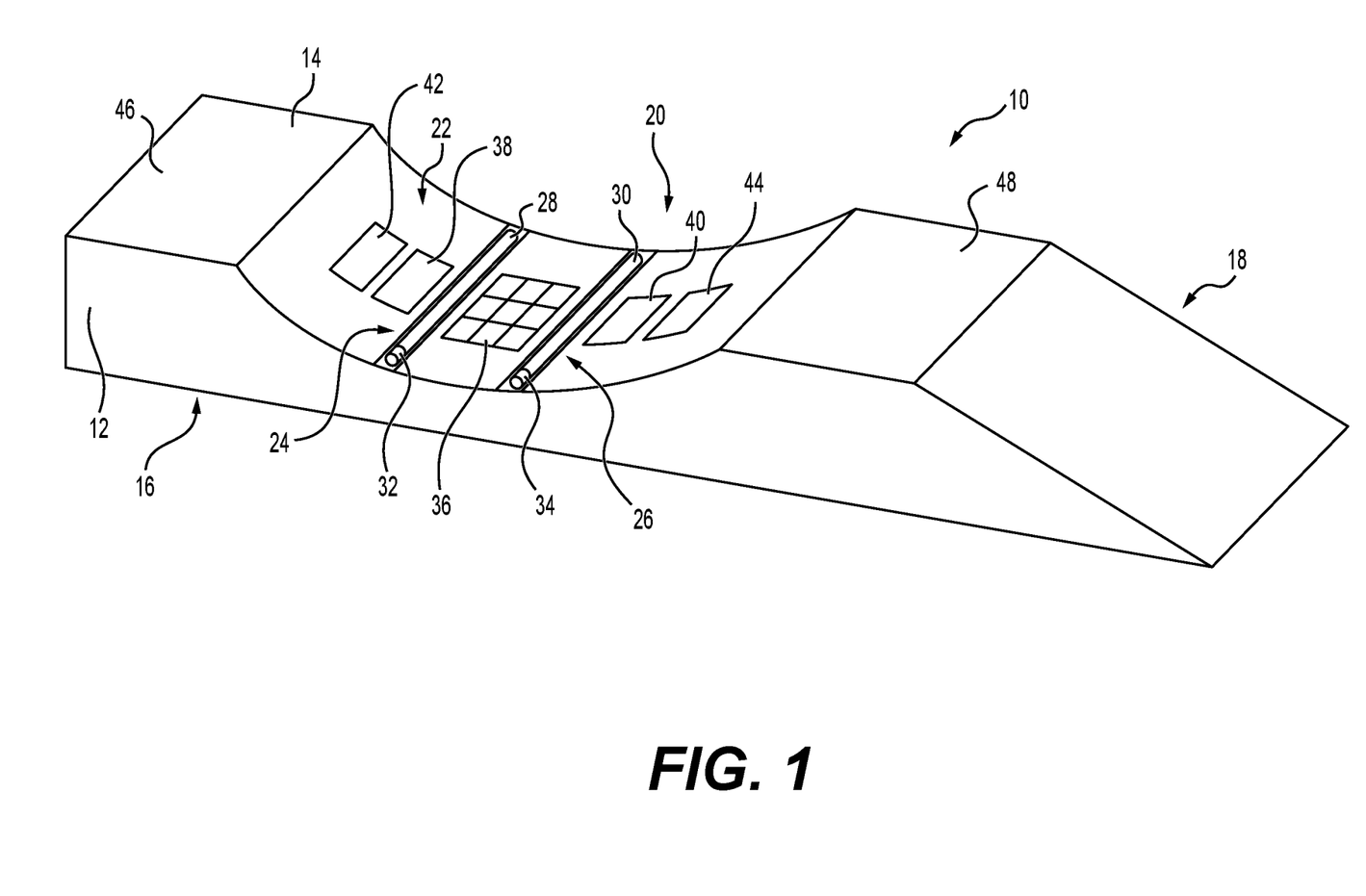
FIG. 1 is a perspective view of a device for rotating and inspecting tires.

As shown in FIGS. 1-4, the device for rotating and inspecting tires 10 includes a housing 12 having opposed upper and lower surfaces 14, 16, respectively. The upper surface 14 has an inclined ramp portion 18 and a support portion 20 having a depression 22 formed therein. The lower surface 16 is adapted for resting on a support surface, such as the ground or the floor, and the upper surface 14 is adapted for receiving a tire T of a vehicle within the depression 22. In the example of FIG. 1, a pair of horizontal surfaces 46, 48 are arranged on either side of depression 22. However, it should be understood that housing 12 is shown for exemplary purposes only and may have any suitable overall shape and relative dimensions. In use, four such devices may be arranged on the floor of a garage, for example, and a vehicle may be driven to ascend the ramp portions 18 of each device 10, with the tires T of the vehicle seating within the respective depressions 22.

Figure 2:
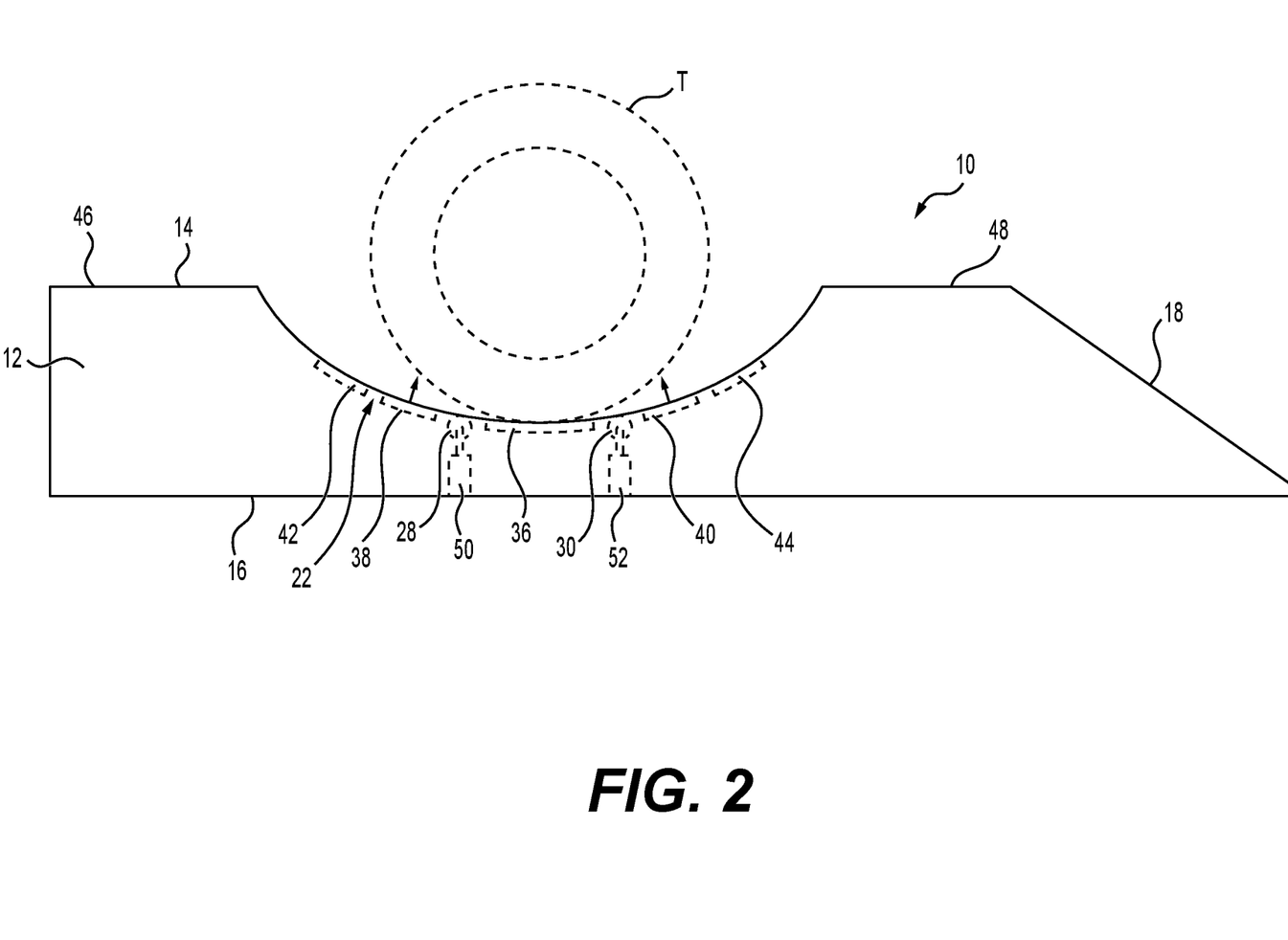
FIG. 2 is a side view of the device for rotating and inspecting tires shown with a tire seated within a depression thereof.
Figure 3:
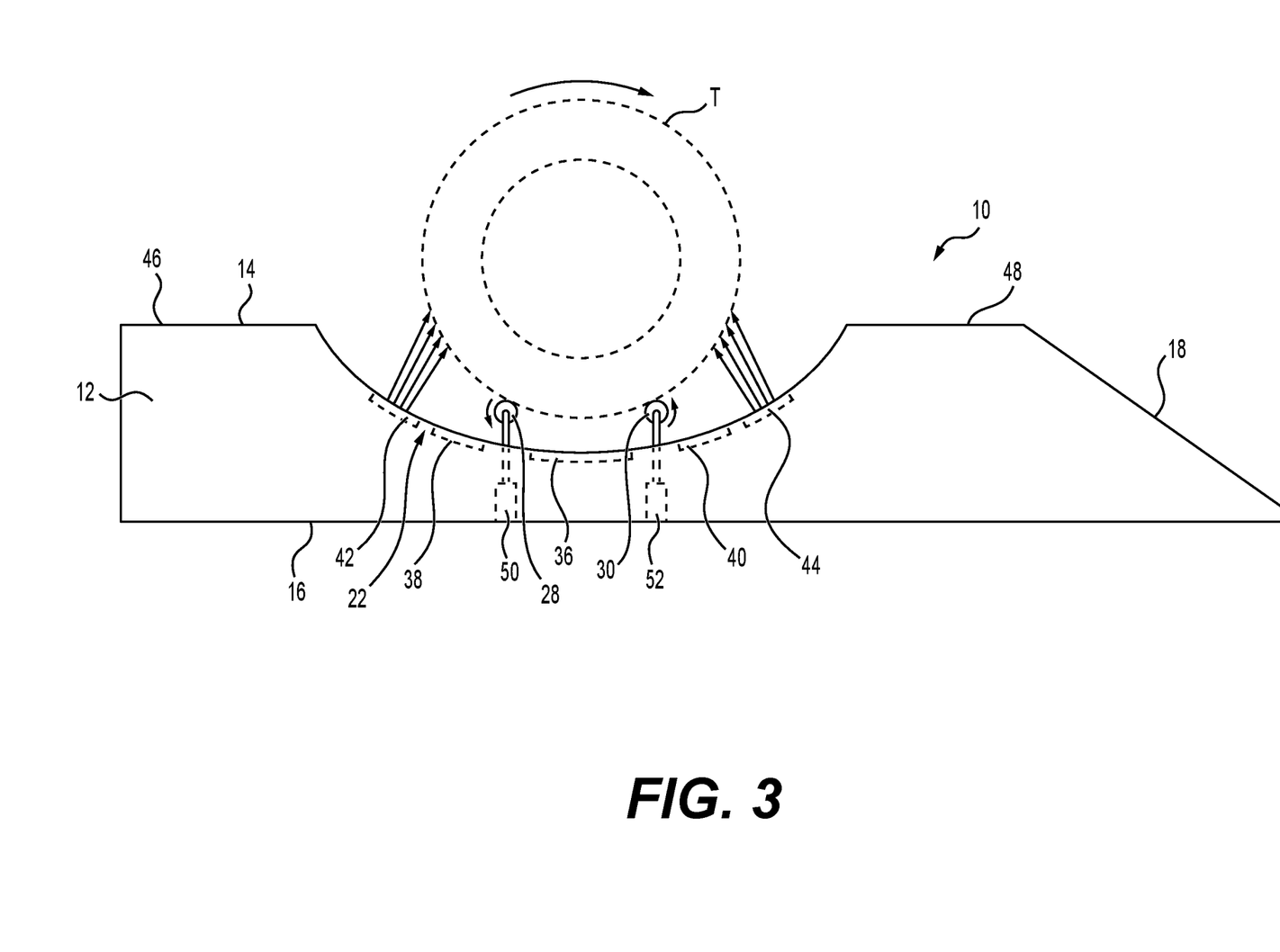
FIG. 3 is a side view of the device for rotating and inspecting tires shown with the tire raised by a pair of rollers.
Figure 4:
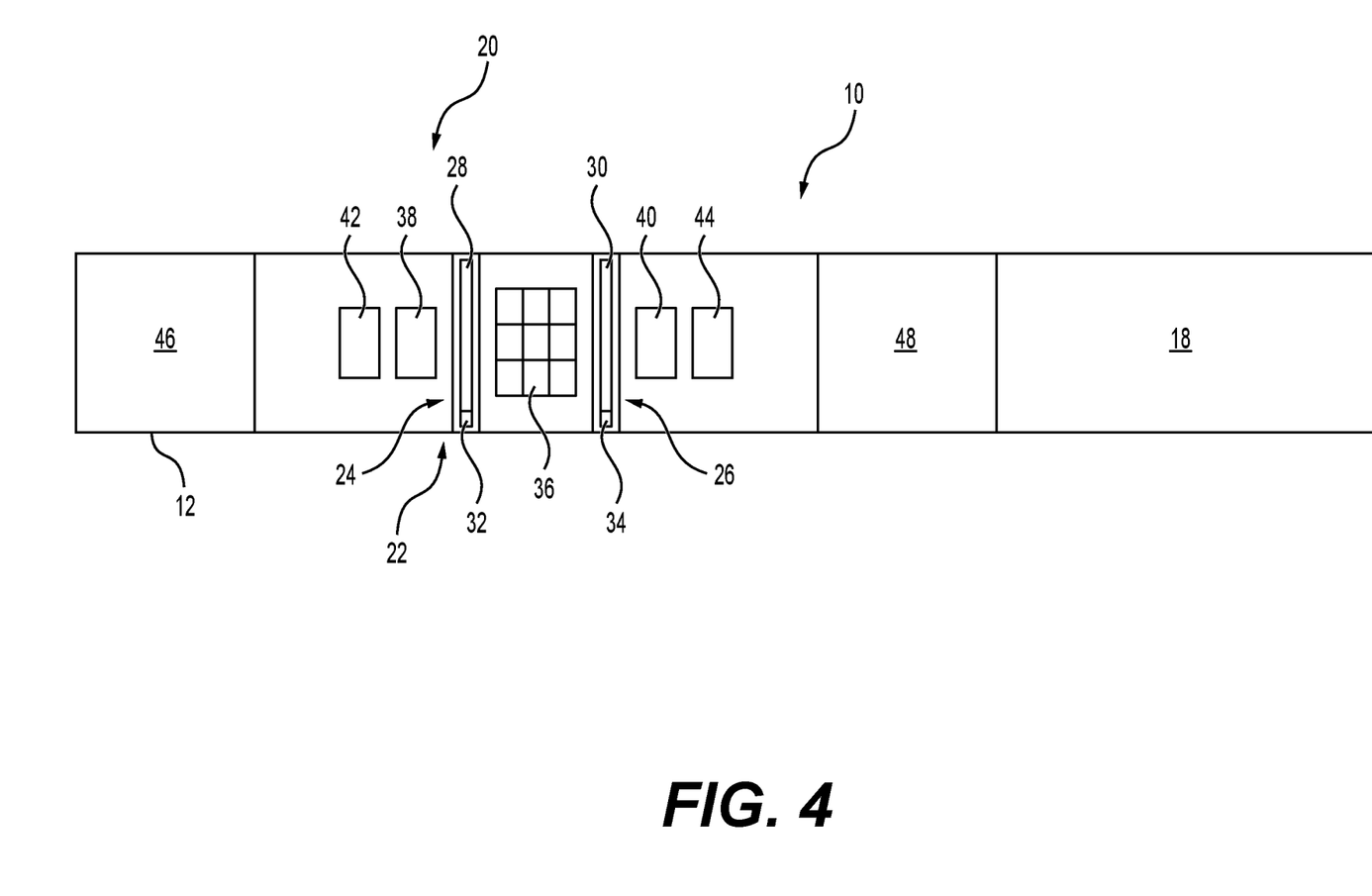
FIG. 4 is a top view of the device for rotating and inspecting tires.

As best seen in FIGS. 1 and 4, a pair of spaced apart slots 24, 26 are formed through the upper surface 14 within the depression 22. A pair of rollers 28, 30 are respectively mounted within the housing 12 beneath the pair of spaced apart slots 24, 26. As shown in FIGS. 2 and 3, each of the rollers 28, 30 has an adjustable height such that the pair of rollers 28, 30 may be selectively raised through the pair of spaced apart slots 24, 26 to a height above the depression 22, as shown in FIG. 3, and may be selectively lowered through the pair of spaced apart slots 24, 26 to rest within the housing 12, as shown in FIG. 2. The rollers 28, 30 may be driven to rotate by respective motors 32, 34 or the like such that, in use, the tire T may be lifted off the upper surface 14 of the housing 12 by raising the rollers 28, 30, as shown in FIG. 3, and the rollers 28, 30 may be driven to rotate the tire T. It should be understood that rollers 28, 30 may be driven by any suitable type of rotational drive, such as, but not limited to, motors, rotational actuators or the like. In FIG. 3, tire T is shown as rotating in a clockwise direction. However, it should be understood that this rotation is shown for exemplary purposes only, and that tire T can also be rotated in a counterclockwise direction or, as a further alternative, rollers 28, 30 may be controllably driven such that the rotational direction of tire T can be alternated. Further, it should be understood that any suitable type of rollers 28, 30 may be used, and that the size, shape and positioning of rollers 28, 30 and the corresponding slots 24, 26 are shown for exemplary purposes only.

Figure 5:
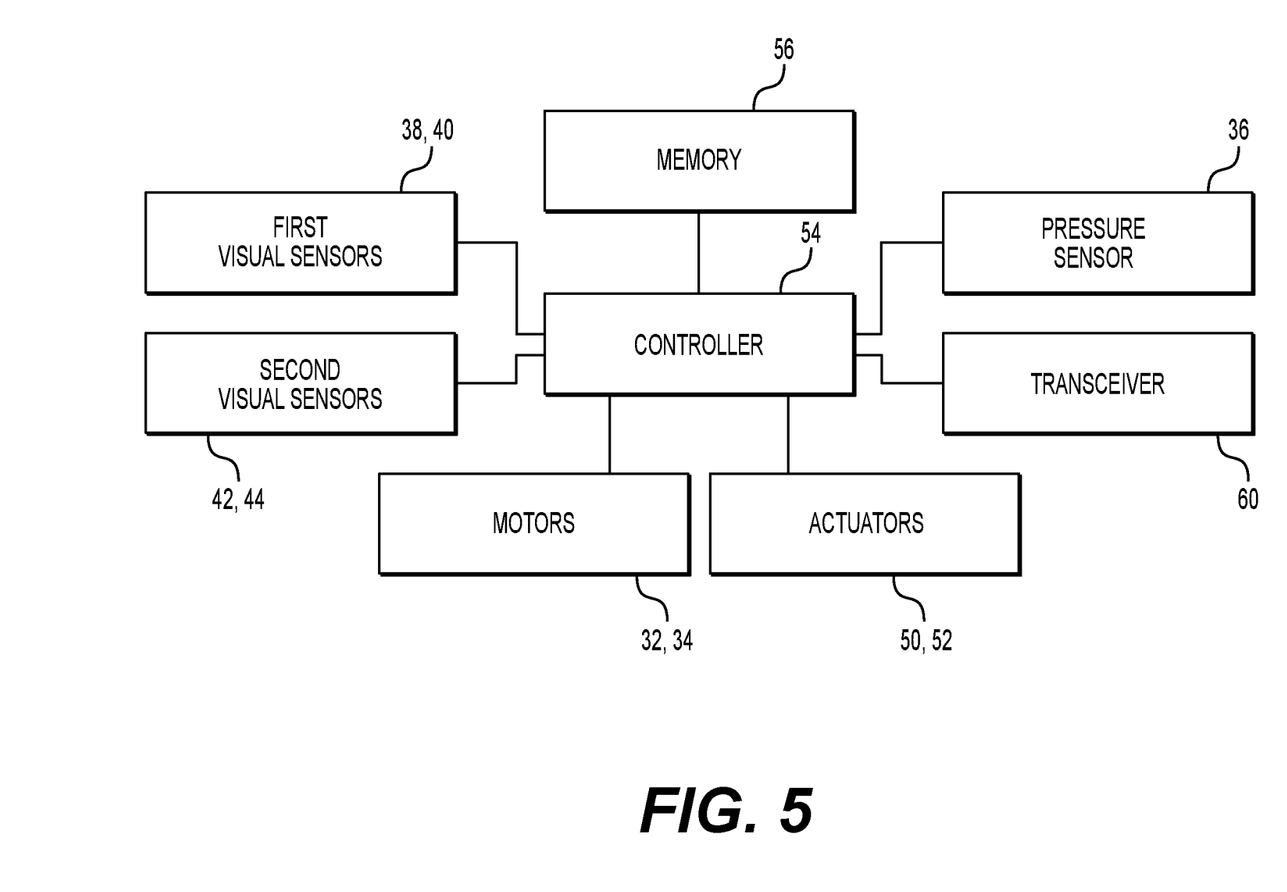
FIG. 5 is a block diagram showing system components of the device for rotating and inspecting tires.

It should be further understood that rollers 28, 30 may be raised and lowered using any suitable type of mechanism. In FIGS. 2 and 3, a pair of linear actuators 50, 52 are shown for respectively raising and lowering rollers 28, 30. However, it should be understood that linear actuators 50, 52 are shown for exemplary purposes only, and that any raising and lowering devices may be used, such as, but not limited to, pneumatic pistons, hydraulic pistons, motors with rotational-to-linear connectors, etc. The raising and lowering of the rollers 28, 30 and also the rotation of the rollers 28, 30 may be controlled by a controller 54 disposed within the housing 12. Controller 54 may be any suitable type of controller, including, but not limited to, a processor, control circuitry, a programmable logic controller or the like. Further, as shown in FIG. 5, controller 54 may be in communication with any suitable type of non-transitory memory storage 56, or may have such memory incorporated therein.

At least one pressure sensor 36 may be mounted on the upper surface 14 of the housing 12 between the pair of spaced apart slots 24, 26. In FIG. 1, an array of pressure sensors 36 is shown. However, it should be understood that any suitable number, arrangement and type of pressure sensors may be used. The at least one pressure sensor 36 may also be in communication with the controller 54 such that the controller 54 may determine a surface area of the tire T that contacts the at least one pressure sensor 36 when it rests on the at least one pressure sensor 36 within the depression. As an example, a perfectly inflated and perfectly circular tire will contact the at least one pressure sensor 36 at only one point. Thus, based on a measurement of the surface area or width of contact between tire T and the at least one pressure sensor 36, the degree of underinflation or "flatness" of the tire T can be determined.

Additionally, at least one first optical sensor may be mounted on the upper surface 14 of the housing for visually measuring dimensions and a shape of the tire T within the depression 22. In FIGS. 1-4, two first optical sensors 38, 40 are shown, positioned on either side of tire T. However, it should be understood that any suitable number, arrangement and positioning of first optical sensors may be used. Further, it should be understood that first optical sensors 38, 40 may be any suitable type of optical sensors, including, but not limited to, cameras, photosensors, photodiodes, lidar units or the like.

The at least one first optical sensor 38, 40 may be in communication with the controller 54 such that the controller 54 may determine a deviation between measured dimensions and a measured shape of the tire T and predetermined ideal dimensions and a predetermined ideal shape of the tire T. For example, memory 56 may have stored therein the dimensions of a perfectly circular and perfectly inflated tire T, where the particular type of tire is also known. First optical sensors 38, 40, which are at known positions with respect to the center of tire T, then measure the height, for example, of the tire wall from their known locations or any other geometrical parameters that can be compared against known locations and shapes for the stored ideal dimensions and a predetermined ideal shape of the tire T. For example, in the case of height, the height of the tire walls directly above the first optical sensors 38, 40 for the ideal perfectly circular and perfectly inflated tire is known. If first optical sensors 38, 40 measure a height that is either more or less than the stored ideal height values, both the size and shape of the actual tire T can be calculated from these values using geometric calculations. Based on the comparison of the measured size and shape with the stored ideal size and shape, controller 54 can further determine whether the tire T is underinflated, overinflated or suffering from a deformation. Although FIG. 2 shows first optical sensors 38, 40 being used while tire T is in the lowered position, it should be understood that first optical sensors 38, 40 may also be used when tire T is in the raised position.

At least one second optical sensor may also be mounted on the upper surface 14 of the housing 12 for visually determining material properties of the tire T. In FIGS. 1-4, two second optical sensors 42, 44 are shown, positioned on either side of tire T. However, it should be understood that any suitable number, arrangement and positioning of second optical sensors may be used. Further, it should be understood that second optical sensors 42, 44 may be any suitable type of visual sensors, including, but not limited to, cameras, photosensors, photodiodes, lidar units or the like.

The at least one second optical sensor 42, 44 may also be in communication with the controller 54 such that the controller 54 may determine a deviation between measured material properties of the tire and predetermined ideal material properties of the tire. For example, memory 56 may have data representative of color, texture, pattern or the like stored therein for a particular type of tire. Second optical sensors 42, 44 may visually scan the exterior of tire T for these parameters and, based on a difference between the measured parameters and those stored in memory 56, controller 54 may determine a degree of wear and/or damage of the tire T. For example, cracking or flaking of the rubber of tire T may be detected by second optical sensors 42, 44, indicative of wear and age. Although FIG. 3 shows second optical sensors 42, 44 being used while tire T is in the raised position, it should be understood that second optical sensors 42, 44 may also be used when tire T is in the lowered position.

Controller 54 may be in communication with a transceiver 60 for transmitting data to a remote user and for receiving control commands therefrom. For example, transceiver may be a cellular transceiver or a Wi-Fi transceiver, allowing a user to actuate and operate device 10 through his or her smartphone or a similar mobile device. When controller 54 makes determinations regarding the condition of tire T from the measurements of sensors 36, 38, 40, 42, 44, the results of the determinations can be transmitted to the user for display on the smartphone. It should be understood that any suitable type of communication and interface may be used, including a local interface with respect to housing 12, a wired remote interface, separate input and display devices, or the like.

It is to be understood that as shown in FIGS. 1-4, the device for rotating and inspecting tires 10 includes a housing 12 having opposed upper and lower surfaces 14, 16, respectively, with a ramp portion 18 of the upper surface 14 being inclined and a support portion 20 of the upper surface 14 having a depression 22 formed therein. The lower surface 16 is adapted for resting on a support surface, such as the ground or the floor, and the upper surface 14 is adapted for receiving a tire T of a vehicle within the depression 22. In FIG. 1, a pair of horizontal surfaces 46, 48 are arranged on either side of depression 22. However, it should be understood that housing 12 is shown for exemplary purposes only and may have any suitable overall shape and relative dimensions. In use, four such devices may be arranged on the floor of a garage, for example, and a vehicle may be driven to ascend the ramp portions 18 of each device 10, with the tires T of the vehicle coming to a rest within the respective depressions 22.

As best seen in FIGS. 1 and 4, a pair of spaced apart slots 24, 26 are formed through the upper surface 14 within the depression 22. A pair of rollers 28, 30 are respectively mounted within the housing 12 beneath the pair of spaced apart slots 24, 26. As shown in FIGS. 2 and 3, each of the rollers 28, 30 has an adjustable height such that the pair of rollers 28, 30 may be selectively raised through the pair of spaced apart slots 24, 26 to a height above the depression 22, as shown in FIG. 3, and may be selectively lowered through the pair of spaced apart slots 24, 26 to rest within the housing 12, as shown in FIG. 2. The rollers 28, 30 may be driven to rotate by respective motors 32, 34 or the like such that, in use, the tire T may be lifted off the upper surface 14 of the housing 12 by raising the rollers 28, 30, as shown in FIG. 3, and the rollers 28, 30 may be driven to rotate the tire T. It should be understood that rollers 28, 30 may be driven by any suitable type of rotational drive, such as, but not limited to, motors, rotational actuators or the like. In FIG. 3, tire T is shown as rotating in a clockwise direction. However, it should be understood that this rotation is shown for exemplary purposes only, and that tire T can also be rotated in a counterclockwise direction or, as a further alternative, rollers 28, 30 may be controllably driven such that the rotational direction of tire T can be alternated. Further, it should be understood that any suitable type of rollers 28, 30 may be used, and that the size, shape and positioning of rollers 28, 30 and the corresponding slots 24, 26 are shown for exemplary purposes only.

It should be further understood that rollers 28, 30 may be raised and lowered using any suitable type of mechanism. In FIGS. 2 and 3, a pair of linear actuators 50, 52 are shown for respectively raising and lowering rollers 28, 30. However, it should be understood that linear actuators 50, 52 are shown for exemplary purposes only, and that any raising and lowering devices may be used, such as, but not limited to, pneumatic pistons, hydraulic pistons, motors with rotational-to-linear connectors, etc. The raising and lowering of the rollers 28, 30 and also the rotation of the rollers 28, 30 may be controlled by a controller 54 mounted within the housing 12. Controller 54 may be any suitable type of controller, including, but not limited to, a processor, control circuitry, a programmable logic controller or the like. Further, as shown in FIG. 5, controller 54 may be in communication with any suitable type of non-transitory memory storage 56, or many have such memory incorporated therein.

At least one pressure sensor 36 may be mounted on the upper surface 14 of the housing 12 between the pair of spaced apart slots 24, 26. In FIG. 1, an array of pressure sensors 36 is shown, however, it should be understood that any suitable number, arrangement and type of pressure sensors may be used. The at least one pressure sensor 36 may also be in communication with the controller 54 such that the controller 54 may determine a surface area of the tire T that contacts the at least one pressure sensor 36 when it rests on the at least one pressure sensor 36 within the depression. For example, a perfectly inflated and perfectly circular tire will contact the at least one pressure sensor 36 at only one point. Thus, based on a measurement of the surface area or width of contact between tire T and the at least one pressure sensor 36, the degree of underinflation or "flatness" of the tire T can be determined.

Additionally, at least one first optical sensor may be mounted on the upper surface 14 of the housing for visually measuring dimensions and a shape of the tire T within the depression 22. In FIGS. 1-4, two first visual sensors 38, 40 are shown, positioned on either side of tire T. However, it should be understood that any suitable number, arrangement and positioning of first optical sensors may be used. Further, it should be understood that first optical sensors 38, 40 may be any suitable type of optical sensors, including, but not limited to, cameras, photosensors, photodiodes, lidar units or the like.

The at least one first optical sensor 38, 40 may be in communication with the controller 54 such that the controller 54 may determine a deviation between measured dimensions and a measured shape of the tire T and predetermined ideal dimensions and a predetermined ideal shape of the tire T. For example, memory 56 may have stored therein the dimensions of a perfectly circular and perfectly inflated tire T, where the particular type of tire is also known. First optical sensors 38, 40, which are at known positions with respect to the center of tire T, then measure a height, for example, of the tire wall from their known locations or any other geometrical parameters that can be compared against known locations and shapes for the stored ideal dimensions and a predetermined ideal shape of the tire T. For example, in the case of height, the height of the tire walls directly above the first optical sensors 38, 40 for the ideal perfectly circular and perfectly inflated tire is known. If first optical sensors 38, 40 measure a height that is either more or less than the stored ideal height values, both the size and shape of the actual tire T can be calculated from these values using geometric calculations. Based on the comparison of the measured size and shape with the stored ideal size and shape, controller 54 can further determine whether the tire T is underinflated, overinflated or suffering from a deformation. Although FIG. 2 shows first optical sensors 38, 40 being used while tire T is in the lowered position, it should be understood that first optical sensors 38, 40 may also be used when tire T is in the raised position.

At least one second optical sensor may also be mounted on the upper surface 14 of the housing 12 for visually determining material properties of the tire T. In FIGS. 1-4, two second optical sensors 42, 44 are shown, positioned on either side of tire T. However, it should be understood that any suitable number, arrangement and positioning of second optical sensors may be used. Further, it should be understood that second optical sensors 42, 44 may be any suitable type of optical sensors, including, but not limited to, cameras, photosensors, photodiodes, lidar units or the like.

The at least one second optical sensor 42, 44 may also be in communication with the controller 54 such that the controller 54 may determine a deviation between measured material properties of the tire and predetermined ideal material properties of the tire. For example, memory 56 may have data representative of color, texture, pattern or the like stored therein for a particular type of tire. Second optical sensors 42, 44 may visually scan the exterior of tire T for these parameters and, based on a difference between the measured parameters and those stored in memory 56, controller 54 may determine a degree of wear and/or damage of the tire T. For example, cracking or flaking of the rubber of tire T may be detected by second optical sensors 42, 44, indicative of wear and age. Although FIG. 3 shows second optical sensors 42, 44 being used while tire T is in the raised position, it should be understood that second optical sensors 42, 44 may also be used when tire T is in the lowered position.

Controller 54 may be in communication with a transceiver 60 for transmitting data to a remote user and for receiving control commands therefrom. For example, transceiver may be a cellular transceiver or a Wi-Fi transceiver, allowing a user to actuate and operate device 10 through his or her smartphone or a similar mobile device. When controller 54 makes determinations regarding the condition of tire T from the measurements of sensors 36, 38, 40, 42, 44, the results of the determinations can be transmitted to the user for display on the smartphone. It should be understood that any suitable type of communication and interface may be used, including a local interface with respect to housing 12, a wired remote interface, separate input and display devices, or the like. is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A device for rotating and inspecting tires, comprising:
   a housing having opposed upper and lower surfaces, a ramp portion of the upper surface having being inclined and a support portion of the upper surface having a depression formed therein, and a pair of spaced apart slots formed through the upper surface within the depression;
   a pair of rollers mounted within the housing beneath the pair of spaced apart slots, each of the rollers having an adjustable height such that the pair of rollers may be selectively raised through the pair of spaced apart slots to a height above the depression formed in the upper surface, and may be selectively lowered through the pair of spaced apart slots to rest within the housing; and
   means for selectively driving rotation of the pair of rollers.

2. The device for rotating and inspecting tires as recited in claim 1, further comprising a controller configured for controlling the rotation of the pair of rollers.

3. The device for rotating and inspecting tires as recited in claim 2, further comprising means for selectively raising and lowering the pair of rollers.

4. The device for rotating and inspecting tires as recited in claim 3, wherein the controller is further configured for controlling the raising and the lowering of the pair of rollers.

5. The device for rotating and inspecting tires as recited in claim 2, further comprising at least one pressure sensor mounted on the upper surface of the housing between the pair of spaced apart slots, the at least one pressure sensor being in communication with the controller.

6. The device for rotating and inspecting tires as recited in claim 4, wherein the controller is further configured to determine a surface area of a tire that makes contact with the at least one pressure sensor when the tire is seated within the depression.

7. The device for rotating and inspecting tires as recited in claim 2, further comprising at least one first optical sensor for visually measuring dimensions and a shape of a tire positioned within the depression, the at least one first optical sensor being in communication with the controller.

8. The device for rotating and inspecting tires as recited in claim 7, wherein the controller is further configured to determine a deviation between measured dimensions and a measured shape of the tire and predetermined ideal dimensions and a predetermined ideal shape of the tire.

9. The device for rotating and inspecting tires as recited in claim 8, further comprising at least one second optical sensor for visually determining material properties of the tire, the at least one second optical sensor being in communication with the controller.

10. The device for rotating and inspecting tires as recited in claim 9, wherein the controller is further configured to determine a deviation between measured material properties of the tire and predetermined ideal material properties of the tire.

11. A device for rotating and inspecting tires, comprising:
    a housing having opposed upper and lower surfaces, a ramp portion of the upper surface having being inclined and a support portion of the upper surface having a depression formed therein, and a pair of spaced apart slots formed through the upper surface within the depression;
    a pair of rollers mounted within the housing beneath the pair of spaced apart slots, each of the rollers having an adjustable height such that the pair of rollers may be selectively raised through the pair of spaced apart slots to a height above the depression formed in the upper surface, and may be selectively lowered through the pair of spaced apart slots to rest within the housing; and
    means for selectively raising and lowering the pair of rollers.

12. The device for rotating and inspecting tires as recited in claim 11, further comprising a controller configured for controlling the raising and lowering of the pair of rollers.

13. The device for rotating and inspecting tires as recited in claim 12, further comprising means for selectively driving rotation of the pair of rollers.

14. The device for rotating and inspecting tires as recited in claim 13, wherein the controller is further configured for controlling the rotation of the pair of rollers.

15. The device for rotating and inspecting tires as recited in claim 12, further comprising at least one pressure sensor mounted on the upper surface of the housing between the pair of spaced apart slots, the at least one pressure sensor being in communication with the controller.

16. The device for rotating and inspecting tires as recited in claim 14, wherein the controller is further configured to determine a surface area of a tire that makes contact with the at least one pressure sensor when the tire is seated within the depression.

17. The device for rotating and inspecting tires as recited in claim 12, further comprising at least one first optical sensor for visually measuring dimensions and a shape of a tire positioned within the depression, the at least one first optical sensor being in communication with the controller.

18. The device for rotating and inspecting tires as recited in claim 17, wherein the controller is further configured to determine a deviation between measured dimensions and a measured shape of the tire and predetermined ideal dimensions and a predetermined ideal shape of the tire.

19. The device for rotating and inspecting tires as recited in claim 18, further comprising at least one second optical sensor for visually determining material properties of the tire, the at least one second optical sensor being in communication with the controller.

20. The device for rotating and inspecting tires as recited in claim 19, wherein the controller is further configured to determine a deviation between measured material properties of the tire and predetermined ideal material properties of the tire.

\* \* \* \* \*